April 12, 1932.  J. A. HUTH  1,853,814
DIATHERMY ELECTRODE
Filed March 4, 1931
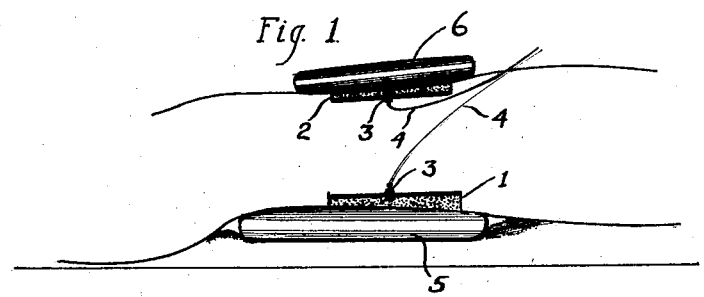
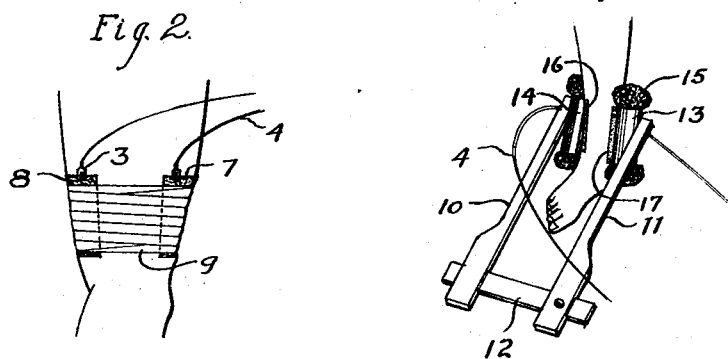
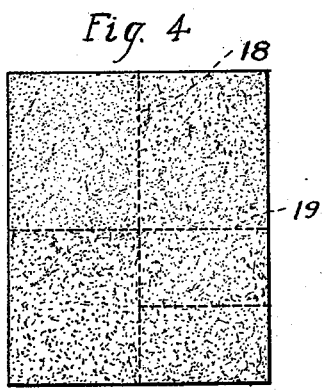
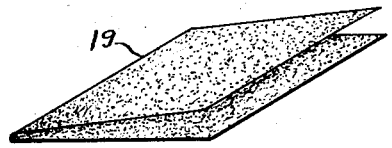
INVENTOR
John A. Huth
BY William B. Jaspert
ATTORNEY Patented Apr. 12, 1932

1,853,814

UNITED STATES PATENT OFFICE

JOHN A. HUTH, OF NATRONA, PENNSYLVANIA

DIATHERMY ELECTRODE

Application filed March 4, 1931. Serial No. 520,055.

This invention relates to improvements in surface electrodes for use in diathermy treatments of the body.

It is among the objects of the invention to provide surface electrodes which shall be efficient in their application as electro-therapeutic devices; which shall be especially adapted to make effective contact with the surface to be treated; which shall be constituted of a relatively thin flexible material to render them applicable and adaptable to the various surface contours of the body; and which shall be of relatively low cost, thereby permitting destruction of the electrode after use and eliminating the necessity for sterilizing.

The application of high frequency currents in therapeutics has been successfully adapted in medical and surgical practice and it has long been established that high frequency currents have great heating properties and are accordingly utilized to produce local heating effects.

Diathermy treatments consist of the application of high frequency currents to areas under treatment by the use of metal plate electrodes which comprise either a very fine metal mesh or block tin which is more commonly used. Tin employed as surface electrodes is of sufficient thickness to convey the current without undue heating and yet thin enough to be molded over the parts to be treated.

In practice, it has been found that the tin electrodes because of their substantial thickness, ranging from 0.010 inches to 0.018 inches, possess numerous disadvantages in their application. The first consideration of the use of block tin is its cost, pure tin being very expensive, and for this reason the electrodes must be used over and over to warrant their use in diathermy treatments. The tin, because of its substantial thickness, is difficult to keep smooth and must constantly be worked with a blunt flat object to smooth out the wrinkles incurred in its application. Furthermore, if the edges or corners of the tin plate electrodes are turned in, they are apt to bruise or lacerate the skin of the patient.

Where tin foil has been used instead of the heavy tin plate, it has been supported on a form or body especially designed for a particular application to the face or joint of the patient, but tin foil is of such poor mechanical strength that it cannot be practically employed as surface electrodes.

A further disadvantage in the use of tin is its poor heat and electrical conductivity which requires the use of a heavy tin body in its application, and another disadvantage is the cutting and molding of the heavy tin sheet metal to the size and shape of electrode it is desired to employ.

The thin mesh electrode herein mentioned is generally employed for local application on diathermy clamps in conjunction with wet rubber sponges or other good current conductors, and is obviously limited in its application.

In the application of plate electrodes, it is necessary that the electrodes be placed in perfect apposition with the surface of the patient's skin to prevent sparking between the electrodes and the skin with its consequent burn.

If the electrodes do not make perfect contact with the skin, the current is not conducted uniformly with the result that the current, in its attempt to jump to moist tissue will cause sparking. Also the heat is generated at the contacting portion of the electrode where the current density is concentrated, thus conclusively establishing the need for perfect contact to effectively treat a given area of the body.

I have discovered that aluminum foil, preferably mottled, obviates most of the difficulties herein referred to in connection with the use of tin plate electrodes, and that aluminum foil is a much more efficient electrode for electro-therapeutics than tin foil, for the following reasons: Aluminum is a far better conductor of heat and electricity than tin and can therefore be employed in thin foil form, the preferred thickness of which I have found in practice to be 0.0008 inches, such thickness being sufficient to conduct the heat and current as will be apparent from a consideration of the relative characteristics of the tin and aluminum as compared with the same properties of copper. On the basis of 1 for copper, the thermal conductivity of tin is 0.145 and for aluminum, 0.51. The electric conductivity of tin is only 12% of the conductivity of copper and aluminum 58% of the conductivity of copper; thus it is apparent that the thermal and electrical conductivity of tin and aluminum are as much out of proportion as the thickness of the tin plate and aluminum foil herein mentioned.

Aside from the properties mentioned, the aluminum foil has a great many advantages as a surface electrode over the tin plate, as follows: The thin flexible nature of the aluminum foil renders it applicable to make perfect contact with the entire surface area of the body with which it contacts as it can be made to mold itself to the contour of the part by either bandaging a pair of such flexible electrodes to the part to be treated or by applying a uniform pressure to the electrode to make it bear evenly against the body, such application being more clearly illustrated in connection with the accompanying drawings constituting a part hereof in which like reference characters designate like parts and in which:

Figure 1 is a side elevational view of a patient's body showing the application of the invention thereto;

Figure 2 a view diagrammatically illustrating the application of aluminum foil electrodes by bandaging;

Figure 3 a view diagrammatically illustrating the use of aluminum foil with clamp electrodes;

Figure 4 a plan view of aluminum foil showing how it may be readily cut or torn to size by folding along the dotted lines; and Figure 5 a view in perspective showing a folded sheet of the foil.

With reference to Figure 1 of the drawings, 1 and 2 designate aluminum foil electrodes applied directly to the skin of a patient for the application of high frequency current, the electrodes being respectively provided with terminal clamps 3 through which electrical connections are made by conductors 4 with a source of high frequency current.

To effect perfect surface contact of the electrode with the skin, the electrode 1 is laid on a sack or pillow 5 filled with sand or other pliable substance so that when the weight of the body rests on the foil it will press the foil against the yielding support of the pillow 5 thereby effecting intimate contact of the electrodes with all portions of the skin which are directly supported by the member 5. Similarly, the electrode 2 is placed on top of the patient and a sand bag or similar device 6 with enough weight to cause the electrode to bear uniformly against the body surface, is placed on the electrode to hold it in intimate contact with the skin. The current is then applied to the electrodes and diathermy treatment is effected. It is customary to employ some contact medium such as a special jelly or paste between the electrode and the skin, but I have found that the aluminum foil, by virtue of its intimate contact with the skin, increases the activity of the skin glands when the current is applied, causing a certain amount of free perspiration which acts as a highly efficient conductor of the high frequency current over the entire surface area of the electrode, thereby entirely eliminating any possibility of sparking or burning and assuring a uniform heating of the body to which the electrode is applied.

In a similar manner, electrodes 7 and 8 may be applied to a joint or portion of the body, as shown in Figure 2, and to produce the intimate contact with the skin essential to efficient diathermy treatments, the foil is applied by means of the bandage 9 which by being wrapped around the foil, causes the latter to mold itself to the contour of the body and assures efficient contact in a manner similar to that produced by the instrumentalities employed, as described in connection with Figure 1 of the drawings.

Aluminum foil may be used in conjunction with so-called permanent diathermic clamps which comprise a pair of clamping arms 10 and 11 mounted on a support 12 on which they are adjustable to clamp a member such as the ankle of the patient between a pair of permanent electrodes 13 and 14 which are connected to the clamping arms. The electrodes are usually of a very thin mesh and rubber sponges 15 are disposed within the electrodes and kept moist to render the electrodes conductive for the application of the high frequency current.

In practice it was found that such clamps are sometimes ineffective because of their inefficient conductivity, and I have found that by employing aluminum foil, 16 and 17, adjacent the skin of the member to be treated, and applying the permanent electrodes thereto, the clamps may be utilized with great success without the use of moist sponges.

It is apparent that the aluminum foil can be readily cut or torn to obtain a size necessary for a particular area of surface to be treated and by merely folding the foil as along the dotted lines 18 and 19, pieces of any size may be torn therefrom in the same manner as tearing folded sheets of paper.

Because of the low cost of the aluminum foil, it is economical to destroy it after use and fresh foil is employed for each successive application of the treatments thus eliminating the dangers of infection incident to the use of permanent tin plate heretofore employed.

It is evident from the foregoing description of this invention that aluminum foil employed in the manner herein described as electro-therapeutic devices, are an efficient high frequency current conductor and heat conductor. It cannot injure the body or skin, eliminates the sparking and burning caused by improper contact and is inexpensive in its use, thereby making diathermy treatments available at much lower cost.

Although several embodiments of the invention have been herein illustrated and described, it will be obvious to those skilled in the art that various modifications may be made in the details of construction without departing from the principles herein set forth.

I claim:

1. A surface electrode for use in diathermy treatments consisting of relatively thin flexible sheet aluminum foil capable of intimately contacting an area of the surface to which it is applied.

2. A surface electrode for use in diathermy treatments consisting of sheet aluminum foil of substantially 0.0008 inches in thickness.

In testimony whereof I have hereunto set my hand.

JOHN A. HUTH.